United States Patent
Baek et al.

(10) Patent No.: US 9,487,637 B2
(45) Date of Patent: Nov. 8, 2016

(54) WATER DISPERSIBLE FLAME RETARDANT COMPOSITION COMPRISING PHOSPHORUS-FUNCTIONALIZED GRAPHITE PREPARATION METHOD THEREOF

(71) Applicant: UNIST ACADEMY-INDUSTRY RESEARCH CORPORATION, Ulsan (KR)

(72) Inventors: Jong-Beom Baek, Ulsan (KR); In-Yup Jeon, Ulsan (KR); Min Jung Kim, Ulsan (KR)

(73) Assignee: UNIST ACADEMY-INDUSTRY RESEARCH CORPORATION, Ulsan (KR)

( * ) Notice: Subject to any disclaimer, the term of this patent is extended or adjusted under 35 U.S.C. 154(b) by 0 days.

(21) Appl. No.: 14/626,214

(22) Filed: Feb. 19, 2015

(65) Prior Publication Data

US 2015/0232636 A1  Aug. 20, 2015

(30) Foreign Application Priority Data

Feb. 20, 2014  (KR) .......... 10-2014-0019651

(51) Int. Cl.
- *C09K 21/12* (2006.01)
- *C01B 31/04* (2006.01)
- *C08K 3/22* (2006.01)
- *C08K 3/04* (2006.01)
- *C09D 5/18* (2006.01)
- *C08K 3/32* (2006.01)
- *C09K 21/04* (2006.01)

(52) U.S. Cl.
CPC ............ *C08K 3/32* (2013.01); *C01B 31/04* (2013.01); *C08K 3/04* (2013.01); *C09D 5/18* (2013.01); *C09K 21/04* (2013.01); *C08K 2003/329* (2013.01); *Y10T 428/2982* (2015.01)

(58) Field of Classification Search
CPC ..................................................... C09K 21/12
See application file for complete search history.

(56) References Cited

U.S. PATENT DOCUMENTS

2013/0018204 A1 * 1/2013 Jeon .............. C01B 31/04
562/89

FOREIGN PATENT DOCUMENTS

| DE | WO 2011039301 A1 * | 4/2011 | ............ C08K 9/12 |
| GB | WO 2012046069 A1 * | 4/2012 | ............ B82Y 30/00 |
| JP | 6-24723 | 2/1994 | |
| JP | 10-101316 | 4/1998 | |

(Continued)

OTHER PUBLICATIONS

Machine translated English language translation of KR 1020130009070 (Jan. 2013, 12 pages).*

(Continued)

*Primary Examiner* — Brieann R Fink
(74) *Attorney, Agent, or Firm* — Oblon, McClelland, Maier & Neustadt, L.L.P.

(57) ABSTRACT

Disclosed is a method for producing edge-functionalized graphite with phosphoric acid. According to the method, graphite is pulverized into smaller pieces and is then exposed to an atmosphere containing oxygen and water. The method enables the production of graphite functionalized with phosphoric acid groups, which could not be achieved by conventional mechanochemical methods. In addition, the method is carried out in a very simple and economical manner and is suitable for large-scale production.

3 Claims, 5 Drawing Sheets

Graphite                                              GPA

(56) References Cited

FOREIGN PATENT DOCUMENTS

| KR | 10-2008-0048680 | | 5/2008 | | |
|----|----|----|----|----|----|
| KR | 10-2013-0009070 A | | 1/2013 | | |
| KR | 102013009070 | * | 1/2013 | ............. | C01B 31/04 |

OTHER PUBLICATIONS

Machine translated English language equivalent of WO 2011039301 (Apr. 2011, 55 pages).*

* cited by examiner

1 → -0.603
2 → 4.423
3 → 6.657
4 → 19.000
5 → 24.931

WATER DISPERSIBLE FLAME RETARDANT COMPOSITION COMPRISING PHOSPHORUS-FUNCTIONALIZED GRAPHITE PREPARATION METHOD THEREOF

CROSS-REFERENCE TO RELATED APPLICATIONS

This application claims priority under 35 U.S.C. §119 to Korean Patent Application No. 10-2014-0019651 filed on Feb. 20, 2014 in the Korean Intellectual Property Office, the disclosure of which is incorporated herein by reference in its entirety.

BACKGROUND OF THE INVENTION

1. Field of the Invention

The present invention relates to a water dispersible flame retardant composition including graphite functionalized with phosphoric acid and a method for preparing the same.

2. Description of the Related Art

In recent years, resin compositions or coating compositions using flame retardants have received attention due to their ability to protect property and save lives from fires. General polymeric materials such as resins and coatings composed of organic polymers are susceptible to heat. The polymer chains of such polymeric materials are liable to be decomposed in the presence of an ignition source and finally the polymeric materials are burnt while releasing large amounts of flammable gases. In comparison with natural polymeric materials, most synthetic polymers are decomposed to produce very toxic gases, posing an increased danger to people in case of fire.

For the purpose of avoiding this danger, excess inorganic materials (e.g., calcium carbonate) are compounded with resin compositions or coating compositions. In this case, however, the inorganic materials deteriorate the physical properties of the compositions in terms of tensile force and elongation, making it difficult to expect good workability. Further, desired heat resistance is difficult to attain when the inorganic materials are mixed in amounts that are workable. Some flame retardants focus on the functions of preventing the heat of combustion and blocking supply of oxygen from the outside to prevent or minimize the propagation of combustion from fires. Such flame retardants include metal hydrate inorganic flame retardants containing metals, halogenated flame retardants, phosphorus-based flame retardants containing phosphoric acid or phosphate, and nitrogen-based flame retardants containing nitrogen atoms. Based on the total amount of flame retardants that are currently in use, inorganic flame retardants are most widely used and halogenated flame retardants follow.

However, toxic gases are produced by incomplete burning of halogens. Water tends to react with halogens. Due to these disadvantages, the use of halogenated flame retardant decrease gradually. For this reason, non-halogenated flame retardants are getting attention with the recent increasing demand. Under such circumstances, phosphorus-based flame retardants are receiving particular interest, and as a result, a steep rise in the price of phosphorus-based flame retardants leads to shortage of supply. Further, since the performance of phosphorus-based flame retardants is still inferior to that of halogenated flame retardants, much research aimed at commercialization of phosphorus-based flame retardant remains to be done.

Japanese Patent Publication No. Hei 6-24723 discloses a flame retardant wallpaper including a flame-retardant, flexible graphite composite and a method for producing the same. Japanese Patent Publication No. Hei 10-101316 discloses a flame retardant composition including a composite of ammonium polyphosphate and graphite. In the flame retardant composition, the use of a strong acid is required to disperse the graphite and the amount of the graphite added is limited.

Korean Patent Application No. 2008-0048680 discloses a volume expandable nontoxic flame retardant resin composition including a polypropylene resin, graphite, red phosphorus, magnesium hydroxide, an ethylene propylene rubber, and a Teflon resin. The composition is merely to obtain a combination of the volume expandability of graphite and the flame retardant effect of red phosphorus. The patent application does not suggest a solution to improve the dispersibility of graphite.

SUMMARY OF THE INVENTION

It is an object of the present invention to provide a water dispersible flame retardant composition free of a halogen releasing harmful gases upon combustion and including graphite as a non-halogenated flame retardant in which the water dispersibility of the graphite is enhanced, facilitating mixing with various resin compositions or coating compositions, and the graphite is combined with phosphoric acid to achieve high flame retardancy.

It is a further object of the present invention to provide a method for preparing the water dispersible flame retardant composition on a large scale at low cost in a simple manner.

It is another object of the present invention to provide a flame retardant coating composition including the water dispersible flame retardant composition.

It is still another object of the present invention to provide a flame retardant resin composition including the water dispersible flame retardant composition.

The present invention provides a water dispersible flame retardant composition including edge-functionalized graphite with phosphoric acid wherein the edge-functionalized graphite with phosphoric acid contains 15 to 50% by weight, preferably 18 to 40% by weight, more preferably 20 to 30% by weight of phosphorus element.

Preferably, the edge-functionalized graphite with phosphoric acid has an average diameter of 50 to 1000 nm.

The present invention also provides a method for producing edge-functionalized graphite with phosphoric acid for a water dispersible flame retardant, including: placing graphite and red phosphorus under vacuum or an inert atmosphere and mechanically pulverizing the graphite; and exposing the pulverized graphite to an atmosphere containing oxygen and water.

The inert atmosphere is created by at least one inert gas selected from argon, helium, and neon, preferably argon.

The graphite is pulverized at a rate of 100 to 10,000 rpm for 1 to 100 hours, preferably at a rate of 100 to 2,000 rpm for 24 to 72 hours.

The graphite is pulverized until the internal temperature of a pulverizer reaches 260 to 500° C., preferably 300 to 450° C.

The atmosphere containing oxygen and water is preferably an air-containing atmosphere.

Preferably, the edge-functionalized graphite with phosphoric acid contains 15 to 50% by weight of phosphorus element and has an average diameter of 50 to 1000 nm.

The present invention also provides a flame retardant coating composition including edge-functionalized graphite with phosphoric acid wherein the edge-functionalized graphite with phosphoric acid contains 15 to 50% by weight of phosphorus element, has an average diameter of 50 to 1000 nm, and is dispersible in water.

The present invention also provides a flame retardant resin composition including edge-functionalized graphite with phosphoric acid wherein the edge-functionalized graphite with phosphoric acid contains 15 to 50% by weight of phosphorus element, has an average diameter of 50 to 1000 nm, and is dispersible in water.

The water dispersible flame retardant composition of the present invention is free of a halogen releasing harmful gases upon combustion and includes graphite as a non-halogenated flame retardant. The water dispersibility of the graphite is enhanced, facilitating mixing with various resin compositions or coating compositions, and the graphite can be combined with phosphoric acid to achieve high flame retardancy.

In addition, the method of the present invention enables the preparation of the water dispersible flame retardant composition on a large scale at low cost in a simple manner and has a very high possibility of commercialization due to its high environmental friendliness.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
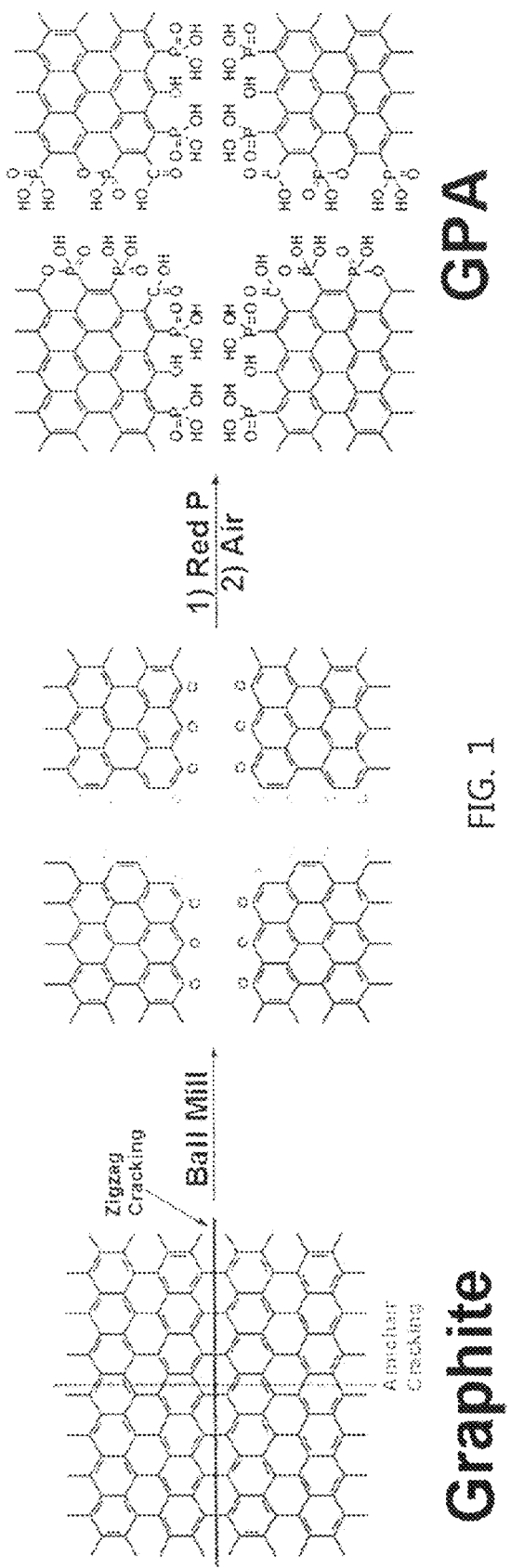
FIG. 1 is a schematic diagram showing a process for producing edge-functionalized graphite with phosphoric acid groups according to one embodiment of the present invention.

The present invention is directed to a water dispersible flame retardant composition including edge-functionalized graphite with phosphoric acid wherein the edge-functionalized graphite with phosphoric acid contains 15 to 50% by weight of phosphorus element.

The content of phosphorus element in the edge-functionalized graphite with phosphoric acid is from 15 to 50% by weight, preferably from 15 to 40% by weight, more preferably 20 to 30% by weight, which is a significantly higher than previously reported graphite doped with heteroatoms.

The phosphoric acid functional groups are highly dispersible in environmentally friendly polar solvents, such as water and ethanol, due to their very high polarity. For this reason, the use of the phosphoric acid functional groups enables the preparation of a solution in a simple manner without involving additional complicated processing, facilitating mixing with a flame retardant coating composition or a flame retardant resin composition to achieve desired flame retardancy. When the edge-functionalized graphite is heated, the phosphoric acid undergoes thermal condensation to produce pyrophosphonic acid or metaphosphonic acid, which forms a protective layer. In addition, the edge-functionalized graphite undergoes dehydration to produce char effective in blocking. The protective layer and the char make the edge-functionalized graphite useful as a flame retardant in the form of a solid.

The edge-functionalized graphite with phosphoric acid has an average diameter of 50 nm to 1000 nm, preferably 100 to 900 nm, more preferably 200 to 800 nm.

The present invention is also directed to a method for producing edge-functionalized graphite with phosphoric acid for a water dispersible flame retardant, including: placing graphite and red phosphorus under vacuum or an inert atmosphere and mechanically pulverizing the graphite; and exposing the pulverized graphite to an atmosphere containing oxygen and water.

The graphite is preferably pulverized in an atmosphere protected from the external environment. As the pulverization proceeds, the edge carbons of the graphite are charged or are present in the form of radicals. The frictional heat produced by the mechanical pulverization increases the temperature of the graphite above the vaporization temperature of the red phosphorus. As a result, the phosphorus can be bound to the edges of the graphite in the phosphorus atmosphere.

If the pulverization is performed in an atmosphere that is not protected from the external environment, the edge charged carbons or carbon radicals of the graphite react preferentially with the external environment, making it impossible to functionalize the edges of the graphite with phosphoric acid groups despite subsequent addition of the phosphorus.

The inert atmosphere for the pulverization of the graphite may be created by argon, helium or neon, and the inert gas mixed with the red phosphorus may be argon, helium or neon. The inert gas is preferably argon. Nitrogen is unsuitable as the inert gas because it reacts with the edge charged carbons or carbon radicals of the pulverized graphite, resulting in a reduction in the amount of the graphite doped with phosphoric acid groups.

The use of highly reactive white phosphorus is unsuitable to stably produce edge-functionalized graphite with phosphoric acid groups.

The graphite and the red phosphorus are in a molar ratio of 1:0.1 to 1:20, preferably from 1:1 to 1:10. If the proportion of the graphite is more than the upper limit, the final graphite may not be sufficiently functionalized at its edges, resulting in a remarkable reduction in the production yield of the functionalized graphite.

In the method of the present invention, a container made of any material may be used to pulverize the graphite therein. The use of a container made of a metal is particularly preferred. Depending on the material for the container, impurities derived from the container material during the graphite pulverization may be incorporated in the final product. Thus, the method of the present invention may further include removing the impurities from the final product after the graphite pulverization.

For example, in the case where the graphite is pulverized in a metal container, an aqueous acid solution may be used to remove the metal after the graphite pulverization.

The acid may be hydrochloric acid, sulfuric acid, nitric acid, carbonic acid, phosphoric acid, acetic acid or perchloric acid having a pH not higher than 3. The acid is preferably hydrochloric acid, sulfuric acid or nitric acid. The acid is present at a molar concentration in the range of 0.1 M to 5 M, preferably 0.5 M to 2 M, which corresponds to that of a weak acid. This range is preferred for the production of functionalized graphite.

The graphite is pulverized at a rate of 100 to 10,000 rpm for 1 to 100 hours, preferably at a rate of 100 to 2,000 rpm for 24 to 72 hours.

The pulverized graphite is preferably allowed to react with the phosphorus compound for 1 to 100 hours. At this time, the internal temperature of the pulverizer is increased to 260 to 500° C., preferably 300 to 450° C. If the internal temperature is less than the lower limit, the red phosphorus may be insufficiently vaporized, resulting in a decrease in the amount of phosphoric acid groups doped. Meanwhile, the internal temperature exceeding the upper limit does not contribute to an increase in the amount of phosphoric acid groups doped.

The atmosphere containing oxygen and water is an air atmosphere. When exposed to the atmosphere, the red phosphorus is converted to phosphoric acid with flying sparks.

The present invention is also directed to a flame retardant coating composition including edge-functionalized graphite with phosphoric acid wherein the edge-functionalized graphite with phosphoric acid contains 15 to 50% by weight of phosphorus element, has an average diameter of 50 to 1000 nm, and is dispersible in water.

The present invention is also directed to a flame retardant resin composition including edge-functionalized graphite with phosphoric acid wherein the edge-functionalized graphite with phosphoric acid contains 15 to 50% by weight of phosphorus element, has an average diameter of 50 to 1000 nm, and is dispersible in water.

The present invention will be explained in more detail with reference to the following examples. These examples are provided to assist in understanding the invention and the scope of the invention is not limited thereto.

EXAMPLES

Example 1

Production of Edge-Functionalized Graphite with Phosphoric Acid Groups

A process for producing edge-functionalized graphite with phosphoric acid groups is schematically shown in FIG. 1.

5 g of graphite (99%, 100 mesh) and 20 g of red phosphorus were placed in a pulverization container made of a metal, and then 500 g of stainless steel balls with a 5 mm diameter were put into the pulverization container. Air was evacuated from the pulverization container using a vacuum pump, argon gas was fed at a pressure of 10 bar, and the graphite was pulverized at about 500 rpm for 48 h.

The temperature of the ball barrel increased to 300-350° C. by the high rotational speed and the frictional force, and the vaporized red phosphorus was reacted with radicals created at the edges of the graphite. After completion of the reaction, the ball barrel was opened in air at room temperature. At this time, the remaining radicals were finally reacted with air. As a result of the reaction, phosphoric acid was formed with flying sparks. Unreacted phosphorus was completely removed by Soxhlet extraction with phosphorus tribromide ($PBr_3$). When phosphorus was not observed any further, 1 M hydrochloric acid was used to remove possible metal impurities from the stainless steel.

Freeze-drying at a low temperature of −120° C. and a low pressure of 0.05 mm Hg for 48 h afforded 10.17 g of the desired product (GPA).

Experimental Example 1

X-Ray Photoelectron Spectroscopy

X-ray photoelectron spectroscopy was used to analyze the surface characteristics (e.g., surface compositions) of the graphite sample of Example 1 before the reaction as a control and the graphite sample (GPA) of Example 1 after the reaction. Specifically, after X-rays were irradiated onto the surface of each sample, the energy of photoelectrons emitted from the sample surface was measured.

Figure 2:
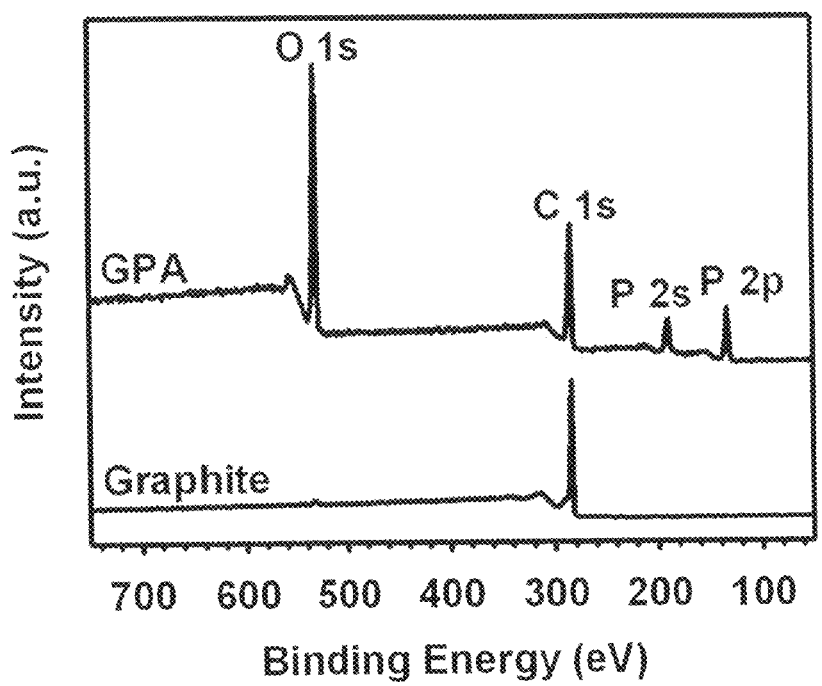
FIG. 2 shows X-ray photoelectron spectra of a graphite sample before reaction and a sample of Example 1, which were measured to confirm the presence of a peak for phosphorus on the sample surfaces in Experimental Example 1.

As a result, a peak for the phosphorus at 133 eV was observed only in the graphite sample of Example 1 after the reaction (FIG. 2).

Experimental Example 2

Analysis of Elemental Mass Ratios

An elemental analyzer was used to analyze the elements in the graphite sample of Example 1 before the reaction as a control and the graphite sample of Example 1. The results are shown in Table 1.

TABLE 1

|  | C | O | P | C/P | Total |
|---|---|---|---|---|---|
| Control | 99.64 | 0.13 | — | — | 99.77 |
| Example 1 | 37.19 | 35.9 | 23.91 | 4.01 | 95.66 |

Experimental Example 3

NMR Analysis

Phosphorus peaks were observed using a nuclear magnetic resonance (NMR) spectrometer. The sample in the form of a solid was loaded into a P-NMR spectrometer where the positions and functionalized states of the element were determined in the presence of a magnetic field.

Figure 3:
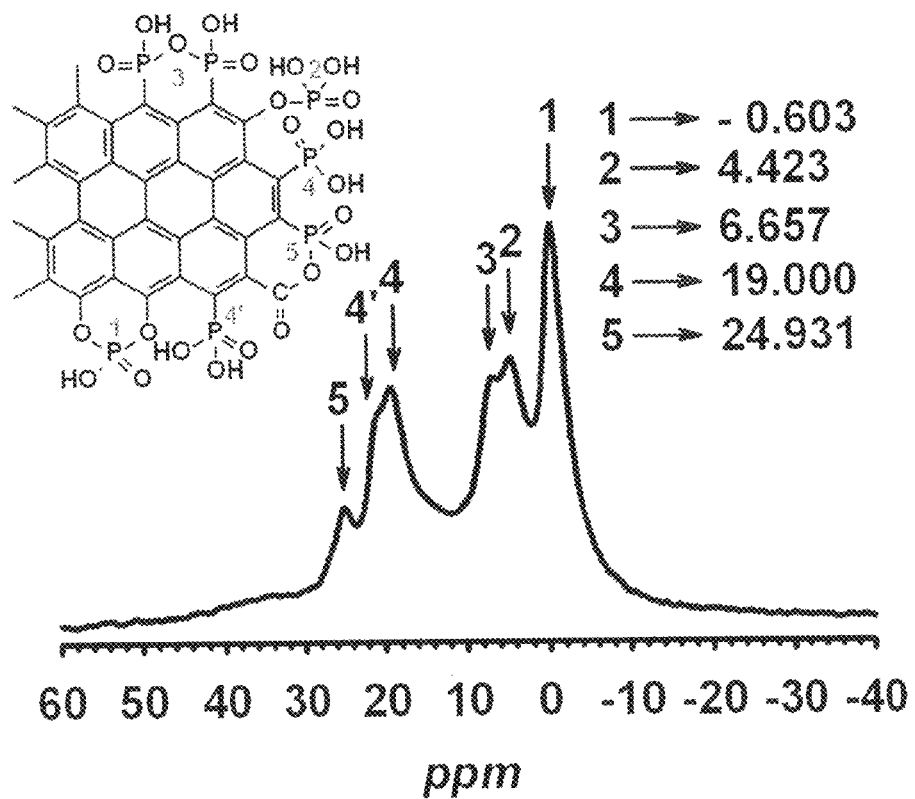
FIG. 3 is a nuclear magnetic resonance (NMR) spectrum of a sample of Example 1, which was measured using an NMR spectrometer in Experimental Example 3.

The peaks of phosphoric acid are typically observed at around 0 ppm in P-NMR. Broad peaks appeared at 0-20 ppm depending on the shape of the edge-functionalized graphite with phosphoric acid. These peaks demonstrate the functionalization of the graphite with phosphoric acid (FIG. 3).

Experimental Example 4

Dispersibility in Solvents

Figure 4:
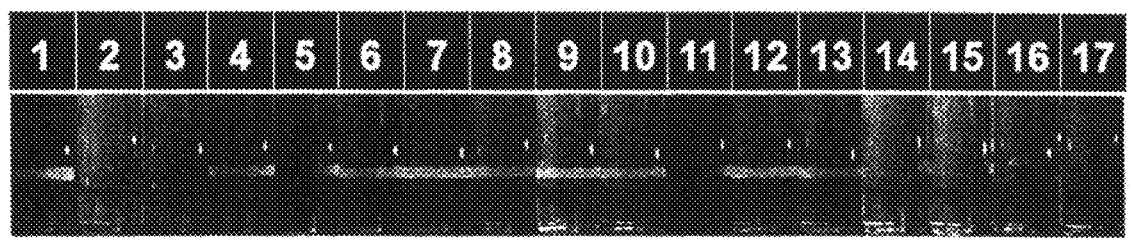
FIG. 4 shows images confirming the dispersibility of a sample of Example 1, which was evaluated depending on whether or not to scatter laser light 1 week after dispersion of the sample in different solvents in Experimental Example 4.

The dispersibility of the graphite was confirmed in non-polar solvents, polar solvents, and aprotic solvents. As shown in FIG. 4, (1) $H_2O$, (2) 1 M HCl, (3) 1 M KOH, (4) 1 M $NH_4OH$, (5) 7 M $NH_4OH$, (6) MeOH, (7) isopropanol, (8) THF, (9) acetone, (10) DMAc, (11) DMF, (12) NMP, (13) $CH_2Cl_2$, (14) toluene, (15) hexane, (16) ethyl acetate, and (17) $CS_2$ were used as the solvents. First, a small amount of the sample of Example 1 was put in a vial, and then each solvent was filled in the vial and dispersed by sonication. Thereafter, the dispersion was allowed to stand at room temperature for one week. The graphite was still dispersed in the solvents having high dispersion performance and scattered incident laser light. In contrast, the graphite was precipitated in the solvents having poor dispersion performance and caused no phenomenon.

These results reveal that the graphite functionalized with phosphorus is highly dispersible in water and polar solvents (FIG. 4).

Experimental Example 5

Energy Dispersive X-Ray Spectroscopy

Figure 5:
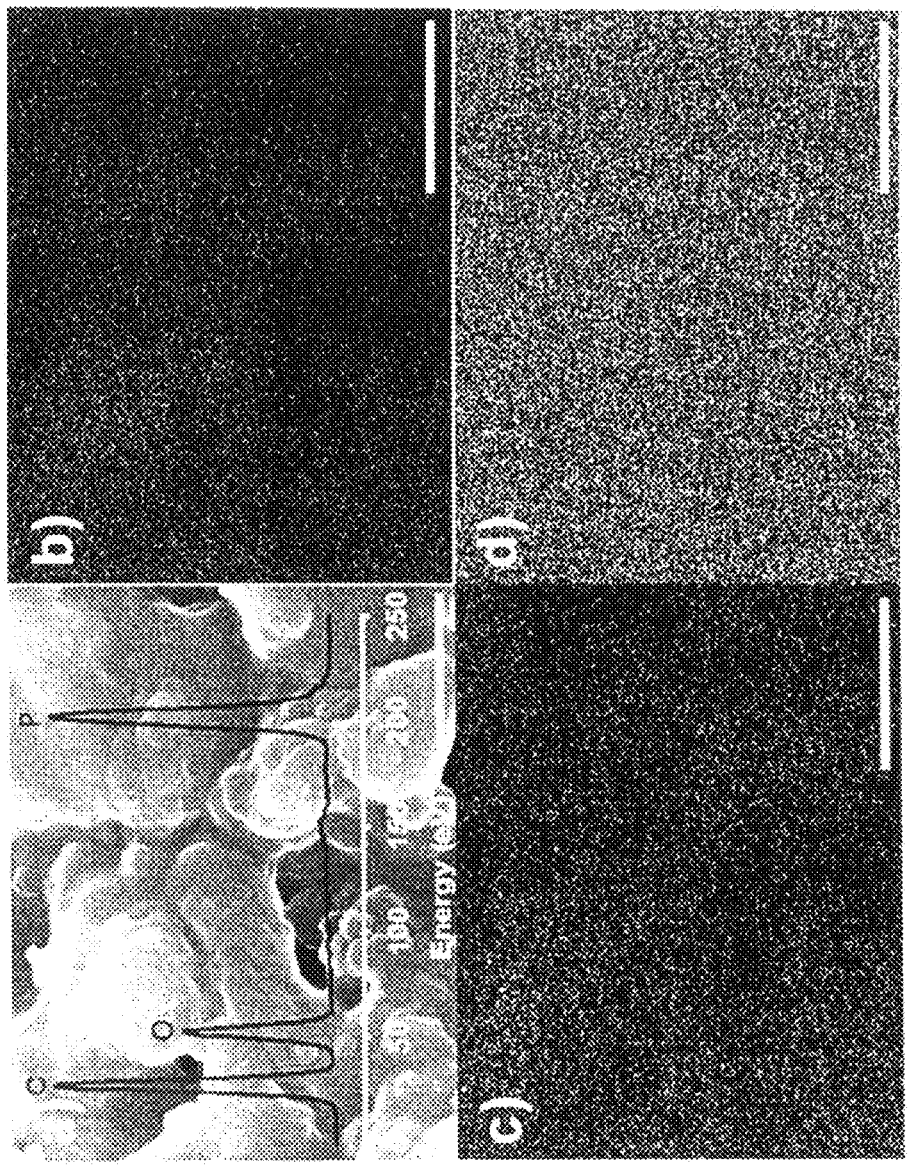
FIG. 5 shows images confirming the presence of phosphorus on the surface of a sample of Example 1 using an energy dispersive X-ray spectrometer in Experimental Example 5, the top left image (a) is a SEM image, the top right image (b) shows the distribution of carbon atoms, the bottom left image (c) shows the distribution of oxygen atoms, and the bottom right image (d) shows the distribution of phosphorus atoms.

Energy dispersive X-ray spectroscopy was used to determine whether phosphorus atoms were present in the graphite sample of Example 1. The sample in the form of a powder was loaded on a SEM holder. In a SEM system, the degrees of distribution of the elements in the sample were determined and quantitative analysis of the sample was performed in EDX mode. The images of FIG. 5 show that a very large amount of phosphorus was distributed, as confirmed by a large peak observed at 200 eV. These results reveal that the graphite was functionalized with a large amount of phosphorus.

Experimental Example 6

Analysis of Flame Retardancy Using Hanji

Figure 6:
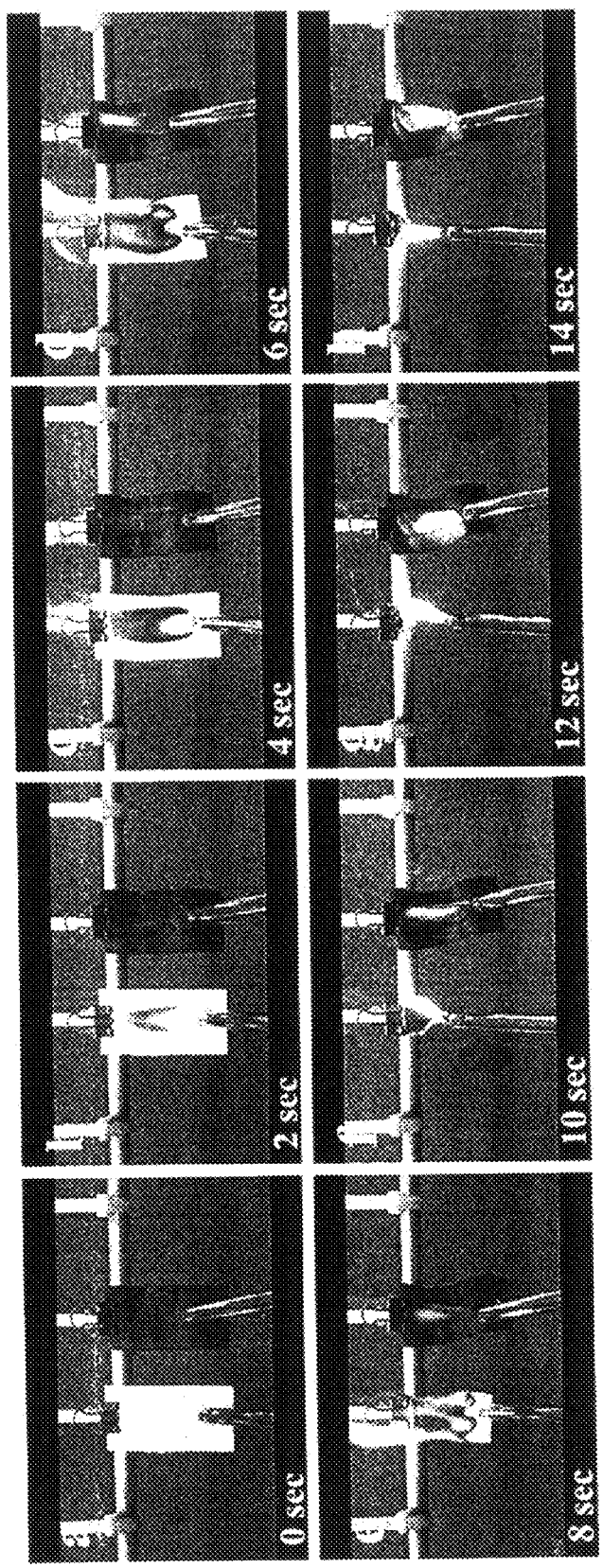
FIG. 6 shows images captured from a sequence of images recorded to observe time-dependent changes in the state of uncoated Hanji (traditional Korean handmade paper) and Hanji coated with a sample of Example 1 every two seconds in Experimental Example 6.

The graphite sample of Example 1 was dispersed at a concentration of 0.2 g/mL in water. Hanji was immersed in the dispersion for about 3 h and dried in a vacuum oven at 50° C. The images of FIG. 6 were obtained from a sequence of images recorded to observe time-dependent changes in the state of uncoated Hanji and the Hanji coated with the sample of Example 1 every two seconds. The uncoated Hanji was completely burnt to ashes within only 10 sec. In contrast, the Hanji coated with the sample of Example 1 did not catch fire and was highly stable under flying sparks.

What is claimed is:

1. A water dispersible flame retardant composition comprising edge-functionalized graphite with phosphoric acid, wherein the edge-functionalized graphite with phosphoric acid contains 20 to 50% by weight of phosphorus element, and wherein the edge-functionalized graphite with phosphoric acid has an average diameter of 50 to 1000 nm.

2. A flame retardant coating composition comprising edge-functionalized graphite with phosphoric acid wherein the edge-functionalized graphite with phosphoric acid contains 20 to 50% by weight of phosphorus element, has an average diameter of 50 to 1000 nm, and is dispersible in water.

3. A flame retardant resin composition comprising edge-functionalized graphite with phosphoric acid wherein the edge-functionalized graphite with phosphoric acid contains 20 to 50% by weight of phosphorus element, has an average diameter of 50 to 1000 nm, and is dispersible in water.

* * * * *